3,146,214
HIGH SEALING STRENGTH WAX COMPOSITIONS
Eugene A. Jakaitis, Morton, and Donald S. Brown, Havertown, Pa., assignors to The Atlantic Refining Company, Philadelphia, Pa., a corporation of Pennsylvania
No Drawing. Filed Aug. 30, 1961, Ser. No. 134,818
10 Claims. (Cl. 260—28.5)

This invention relates to wax compositions and, more particularly, to paraffin wax compositions having unexpectedly high seal strength characteristics.

Paraffin wax has long been used as a moistureproof coating agent for a variety of materials. However, paraffin wax has certain inherent undesirable properties which necessitate the incorporation of various additives to the wax to obtain better coating properties.

It is well-known in the art that if minor amounts, i.e., less than 5 percent by weight, of a polyethylene having a molecular weight of at least 12,000 is added to paraffin wax, while certain desirable properties, such as blocking temperature, are improved, the seal strength, however, as measured by the TAPPI Test for Sealing Strength of Paraffin Waxes (T–642–sm–54), is deleteriously affected.

It has recently been found that if a copolymer of ethylene and vinyl acetate is added to paraffin wax, the seal strength is somewhat improved. It would be expected that if a mixture of polyethylene and an ethylene-vinyl acetate copolymer were added to paraffin wax, the seal strength of this mixture would be less than the seal strength of an ethylene-vinyl acetate-copolymer-wax mixture.

Quite unexpectedly, it has been found that if a mixture of polyethylene and an ethylene-vinyl acetate copolymer is added to paraffin wax, the seal strength of the composition is vastly superior to that of the paraffin wax alone or of a mixture of wax and polyethylene or of a mixture of wax and ethylene-vinyl acetate copolymer.

It is, therefore, an object of this invention to provide novel wax compositions.

It is another object of this invention to provide paraffin wax compositions having high seal strengths.

It is a further object of this invention to provide compositions comprising paraffin wax, polyethylene, and ethylene-vinyl acetate copolymers, which compositions have high seal strengths.

Other objects will become apparent from the following description and claims.

As stated above, it has been found that compositions of paraffin wax, polyethylene, and ethylene-vinyl acetate copolymers have unexpectedly high seal strengths.

The polyethylene component of the composition of this invention has a molecular weight of from about 12,000 to about 21,000, preferably from about 16,000 to about 21,000. The polyethylene is present in an amount ranging from 0.1 weight percent to 5.0 weight percent, preferably from 0.4 weight percent to 2.5 weight percent.

The ethylene-vinyl acetate copolymers used in this invention have a molecular weight of at least 25,000, preferably from 30,000 to 45,000, and a polymerized vinyl acetate content of from 5 weight percent to 40 weight percent, preferably in excess of 25 weight percent and ranging up to 35 weight percent. These copolymers may be prepared by copolymerizing a mixture of ethylene and vinyl acetate in the presence of a catalyst, such as oxygen or an organic peroxide, for example, t-butyl hydroperoxide, in a tubular reactor at pressures ranging between 15,000 p.s.i.g. and 30,000 p.s.i.g. at a temperature ranging between 150° C. and 250° C. and then separating the resultant copolymer from unreacted monomers by flashing off the unreacted monomers.

The paraffin wax used in this invention is a petroleum wax having a melting point of from about 120° F. to about 150° F.

Various blends of polyethylene, ethylene-vinyl acetate copolymer and a paraffin wax having a melting point of 141° F. were compounded and each blend was tested for seal strength according to the TAPPI Test for Sealing Strength of Paraffin Waxes (T–642–sm–54).

The polyethylene used in the tests had a molecular weight of 12,000, 16,000, or 21,000 as indicated. The ethylene-vinyl acetate copolymer used in the tests was that sold commercially by the Du Pont Company under the name Elvax 250. This material has a molecular weight of about 40,000 and a polymerized vinyl acetate content of about 28 weight percent.

Table

| Sample No. | Polyethylene | | Copolymer, wt. percent | Seal strength |
|---|---|---|---|---|
| | Wt. percent | Mol. wt. | | |
| 1 | | | | 17.0 |
| 2 | 1.0 | 12,000 | | 14.0 |
| 3 | 2.0 | 12,000 | | 13.0 |
| 4 | 1.0 | 16,000 | | 13.0 |
| 5 | 2.0 | 16,000 | | 12.0 |
| 6 | 1.0 | 21,000 | | 10.0 |
| 7 | 2.0 | 21,000 | | 8.0 |
| 8 | | | 2.0 | 17.5 |
| 9 | | | 3.0 | 28.0 |
| 10 | | | 4.0 | 38.0 |
| 11 | | | 5.0 | 44.0 |
| 12 | | | 8.0 | 60.0 |
| 13 | | | 10.0 | 66.5 |
| 14 | | | 13.0 | 72.0 |
| 15 | | | 14.0 | 72.0 |
| 16 | 0.1 | 16,000 | 5.0 | 51.0 |
| 17 | 0.1 | 16,000 | 8.0 | 64.0 |
| 18 | 0.1 | 21,000 | 5.0 | 54.0 |
| 19 | 0.1 | 21,000 | 8.0 | 96.0 |
| 20 | 0.375 | 16,000 | 5.0 | 51.0 |
| 21 | 0.375 | 16,000 | 8.0 | 72.0 |
| 22 | 0.375 | 21,000 | 4.0 | 50.0 |
| 23 | 0.375 | 21,000 | 5.0 | 62.0 |
| 24 | 0.375 | 21,000 | 6.0 | 88.0 |
| 25 | 0.375 | 21,000 | 7.0 | 107.0 |
| 26 | 0.375 | 21,000 | 8.0 | 120.0 |
| 27 | 0.75 | 21,000 | 4.0 | 53.0 |
| 28 | 0.75 | 21,000 | 5.0 | 70.0 |
| 29 | 0.75 | 21,000 | 6.0 | 92.0 |
| 30 | 0.75 | 21,000 | 7.0 | 104.0 |
| 31 | 0.75 | 21,000 | 8.0 | 115.0 |
| 32 | 2.5 | 16,000 | 5.0 | 51.0 |
| 33 | 2.5 | 16,000 | 8.0 | 72.0 |
| 34 | 2.5 | 21,000 | 5.0 | 72.0 |
| 35 | 2.5 | 21,000 | 8.0 | 78.0 |
| 36 | 5.0 | 16,000 | 5.0 | 43.0 |
| 37 | 5.0 | 16,000 | 8.0 | 72.0 |
| 38 | 5.0 | 21,000 | 5.0 | 72.0 |
| 39 | 5.0 | 21,000 | 8.0 | 72.0 |

From the data shown in the table it is apparent from Sample Nos. 2 to 7, inclusive, that as the concentration and molecular weight of polyethylene added to a paraffin wax is increased, the seal strength of the mixture is decreased. As the ethylene-vinyl acetate copolymer concentration in wax is increased, the seal strength of the mixture is increased to a maximum of about 72.0 (Sample Nos. 8 to 15, inclusive).

The seal strength values obtained for Sample Nos. 16 to 39, inclusive, clearly show the synergistic effect of the polyethylene and the vinyl acetate copolymer in the wax. It is surprising that in certain instances the seal strength of the three component mixture is almost twice the seal strength obtainable merely by the addition of the ethylene copolymer to the wax (compare Sample Nos. 12 with 26 and 31).

We claim:

1. A high sealing strength composition comprising 85.0 to 97.9 weight percent paraffin wax, 0.1 to 5.0 weight percent polyethylene, and 2.0 to 10.0 weight percent copolymer of ethylene and vinyl acetate, said paraffin wax having a melting point ranging between 120° F. and 150° F., said polyethylene having a molecular weight ranging from 12,000 to 21,000 and said copolymer having a molecular weight of at least 25,000 and a polymerized vinyl acetate content of from 5 to 40 weight percent.

2. A high sealing strength composition comprising 85.0 to 97.9 weight percent paraffin wax, 0.1 to 5.0 weight percent polyethylene, and 2.0 to 10.0 weight percent copolymer of ethylene and vinyl acetate, said paraffin wax having a melting point ranging between 120° F. and 150° F., said polyethylene having a molecular weight ranging from 12,000 to 21,000 and said copolymer having a molecular weight of from 25,000 to 45,000 and a polymerized vinyl acetate content of from 5 to 40 weight percent.

3. A high sealing strength composition comprising 89.5 to 95.6 weight percent paraffin wax, 0.4 to 2.5 weight percent polyethylene, and 4.0 to 8.0 weight percent copolymer of ethylene and vinyl acetate, said paraffin wax having a melting point ranging between 120° F. and 150° F., said polyethylene having a molecular weight of from 16,000 to 21,000 and said copolymer having a molecular weight of from 30,000 to 45,000 and a polymerized vinyl acetate content in excess of 25 weight percent and ranging up to 35 weight percent.

4. A high sealing strength composition comprising 91.9 weight percent paraffin wax, 0.1 weight percent polyethylene, and 8.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

5. A high sealing strength composition comprising 91.6 weight percent paraffin wax, 0.4 weight percent polyethylene, and 8.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

6. A high sealing strength composition comprising 91.25 weight percent paraffin wax, 0.75 weight percent polyethylene, and 8.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

7. A high sealing strength composition comprising 89.5 weight percent paraffin wax, 2.5 weight percent polyethylene, and 8.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

8. A high sealing strength composition comprising 87.0 weight percent paraffin wax, 5.0 weight percent polyethylene, and 8.0 weight percent ethylene-vinyl acetate copolymer, said paraffin wax having a melting point of 141° F., said polyethylene having a molecular weight of 16,000 and said copolymer having a molecular weight of 40,000 and a polymerized vinyl acetate content of 28 weight percent.

9. A high sealing strength composition comprising 90.0 weight percent paraffin wax, 5.0 weight percent polyethylene, and 5.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

10. A high sealing strength composition comprising 87.0 weight percent paraffin wax, 5.0 weight percent polyethylene, and 8.0 weight percent ethylene-vinyl acetate copolymer, said paraffin wax having a melting point of 141° F., said polyethylene having a molecular weight of 21,000 and said copolymer having a molecular weight of 40,000 and a polymerized vinyl acetate content of 28 weight percent.

References Cited in the file of this patent

UNITED STATES PATENTS

| | | |
|---|---|---|
| 2,638,459 | Bowman et al. | May 12, 1953 |
| 2,877,196 | Reding | Mar. 10, 1959 |